Figure 1:
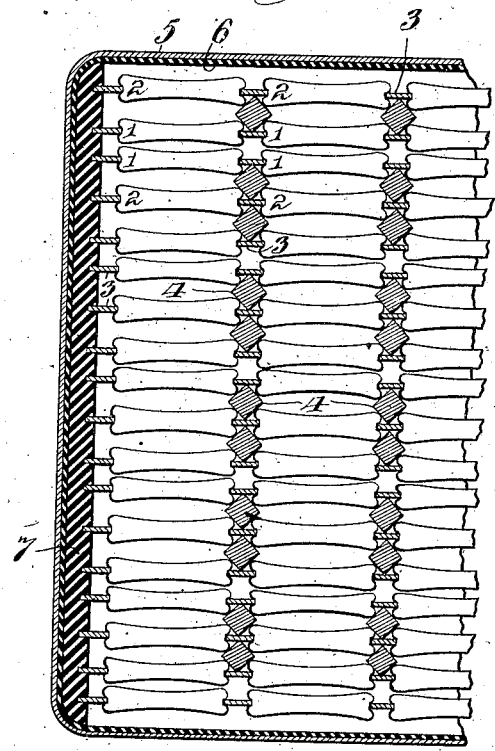

No. 821,032. PATENTED MAY 22, 1906.
T. A. EDISON.
STORAGE BATTERY.
APPLICATION FILED SEPT. 28, 1904.

UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

No. 821,032.      Specification of Letters Patent.      Patented May 22, 1906.

Application filed September 28, 1904. Serial No. 226,314.

*To all whom it may concern:*

Be it known that I, THOMAS A. EDISON, a citizen of the United States of America, residing at Llewellyn Park, Orange, county of Essex, State of New Jersey, have invented certain new and useful Improvements in Storage Batteries, of which the following is a specification.

My invention relates to improvements in storage batteries of the type invented by me wherein the active materials containing, respectively, nickel and iron are maintained under pressure in small pockets or receptacles made of perforated sheet metal and held in position in suitable grids.

I find in practice that bulk for bulk finely-divided iron obtained by reducing ferric oxid (see my Patent No. 727,118, dated May 5, 1903) is much more active electrolytically than the nickel hydroxid that I have so far been able to obtain practically. Consequently to present the best combination for practical use the bulk of iron used need be only half that of the nickel.

I find that if the attempt is made to employ pockets of nickel of twice the capacity as the iron-pockets the surface in contact with the metal walls is not large enough to provide for the proper discharge rate. Furthermore, such an arrangement would be undesirable commercially, for the reason that it would necessitate the employment of widely-different machines for manufacturing and assembling the nickel and iron grids and also because the great bulk of nickel used would necessitate pockets of prohibitively thick metal in order to accommodate the swelling, and, finally, because with a thick mass of nickel the proper circulation of the electrolyte could not be secured. I have discovered that by making the pockets for the nickel of substantially the same size as those for the iron and by using twice as many nickel grids as iron grids a practically useful combination is secured, since the necessarily large contact-surface is presented to give the desired discharge rate, ample opportunity is offered for the circulation of the electrolyte, and the bulk of nickel in each pocket is not too large, as by its swelling, to necessitate the employment of objectionably thick metal. Furthermore, the space between the adjacent nickel-pockets provides for opportunity for any swelling to take place. Heretofore in the construction of my battery I have employed insulating-separators between the several grids; but I find that these separators are not necessary between the adjacent nickel grids, which may therefore be allowed to swell, so as to touch each other without affecting the circulation of the electrolyte or the general operation of the battery. I thus effect a saving in lateral space and further reduce the objections due to swelling of the active materials, and particularly the nickel hydroxid.

In order that the invention may be better understood, attention is directed to the accompanying drawings, forming part of this specification, and in which—

Figure 2:
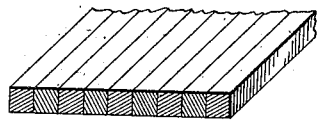

Figure 1 is a cross-sectional view through one of my improved storage batteries embodying the present invention and showing the preferred form of separators, and Fig. 2 a perspective view illustrating the manner of manufacturing the preferred form of separators.

In both the above views corresponding parts are indicated by the same reference-numerals.

In the drawings, 1 1 represent nickel-pockets, and 2 2 iron-pockets, the former being arranged in pairs, as shown. The several pockets contain the active material in pulverized form and are secured in position within suitable grids 3 in the usual way. Insulating-separators are employed between the iron-pockets and the adjacent nickel-pockets to prevent the pockets from contacting under the effect of swelling of the active materials; but preferably separators are not employed between the adjacent nickel-pockets, which may swell, so as to actually touch without objection. By dispensing with separators between the nickel-pockets I obtain space enough in which the entire expansion may take place. The separators which I preferably use are diamond-shaped in cross-section, as shown in Fig. 1 by the numeral 4. These separators are made of hard rubber, preferably by cutting a sheet thereof into sections, as shown in Fig. 2, whereby they may be manufactured very cheaply. The separators are so proportioned that each engages the rounded corners of four of the pockets, while at the same time the adjacent grids are spaced a distance determined by the length of one of the diagonals of each separator, as shown. With this arrangement the adjacent pockets will be always effectively separated.

The several electrodes are assembled in any suitable can or receptacle 5, lined with a sheet of hard rubber 6 or other insulating material, and are spaced at their ends by slotted separating-bars 7 in the usual way.

Having now described my invention, what I claim as new therein, and desire to secure by Letters Patent, is as follows:

In a storage battery employing an alkaline electrolyte and active materials containing iron and nickel respectively, the combination of a series of grids or plates carrying pockets for the iron composition, and a series of grids or plates carrying pockets for the nickel composition, said latter grids being placed in pairs between the individual grids of the former series, and the volume of active material carried by each grid of the battery being substantially the same, substantially as set forth.

This specification signed and witnessed this 10th day of August, 1904.

THOS. A. EDISON.

Witnesses:
FRANK L. DYER,
MINA C. MACARTHUR.